UNITED STATES PATENT OFFICE.

JOHN C. RORICK, OF WAUSEON, OHIO.

IMPROVEMENT IN BUTTER-COLORING COMPOUNDS.

Specification forming part of Letters Patent No. 163,610, dated May 25, 1875; application filed August 8, 1874.

*To all whom it may concern:*

Be it known that I, JOHN C. RORICK, of Wauseon, in the county of Fulton and State of Ohio, have invented a new and valuable Improvement in Coloring Matter for Butter; and I do hereby declare that the following is a full, clear, and exact description of the same.

The object of this invention is to obtain an improved compound for coloring butter, which shall at the same time act as an excellent antiseptic, and preserve the butter pure and sweet for an indefinite period of time.

I put into a suitable can, which is suspended in a caldron of water, fifty pounds of lard, fresh butter, or olive-oil, to serve as a body for the coloring matters and the antiseptic which I employ. I then take three pounds of annotto, and add water to it, and stir until it is about the consistency of thin paste, when I add one-half of a pound of *curcuma*, (turmeric,) and stir it well with the annotto. When thoroughly mixed, I heat the lard, butter, or oil, whichever one of these substances it is desired to use, to about 110° Fahrenheit, and take about five pounds of it and stir thoroughly with the annotto and *curcuma*, prepared as stated, and put the whole mass into the can above referred to, and stir the substances well together, adding at the same time five pounds of common salt and three ounces of saltpeter. The substances are then brought to a boiling heat, and stirred from time to time until the coloring matter is dark enough for use. It takes ordinarily from twelve to twenty-four hours to properly cook the coloring matter, after which it is poured into cans which can be well stopped, and to every ten pounds five fluid ounces of bromo-chloralum are added, when it is shaken until cold.

One pound of coloring matter will usually be sufficient for one hundred pounds of butter.

What I claim as new, and desire to secure by Letters Patent, is—

An antiseptic coloring matter composed of the annotto, *curcuma*, and bromo-chloralum, mixed together in about the proportions set forth.

In testimony that I claim the above I have hereunto subscribed my name in the presence of two witnesses.

JOHN C. RORICK.

Witnesses:
GEORGE E. UPHAM,
H. C. HOLLINGSHEAD.